US012776064B2

(12) United States Patent
Staats et al.

(10) Patent No.: US 12,776,064 B2
(45) **Date of Patent: *Oct. 27, 2026**

(54) VEHICLE LOCATION DETERMINING SYSTEM AND METHOD

(71) Applicant: Westinghouse Air Brake Technologies Corporation, Pittsburgh, PA (US)

(72) Inventors: Andrew Ryan Staats, Cedar Rapids, IA (US); Joseph Gorman, Cedar Rapids, IA (US); Jeffrey D. Kernwein, Cedar Rapids, IA (US); Stuart J. Barr, Cedar Rapids, IA (US)

(73) Assignee: Westinghouse Air Brake Technologies Corporation, Pittsburgh, PA (US)

(*) Notice: Subject to any disclaimer, the term of this patent is extended or adjusted under 35 U.S.C. 154(b) by 384 days.

This patent is subject to a terminal disclaimer.

(21) Appl. No.: 18/467,367

(22) Filed: Sep. 14, 2023

(65) Prior Publication Data

US 2024/0005555 A1 Jan. 4, 2024

Related U.S. Application Data

(63) Continuation-in-part of application No. 17/174,065, filed on Feb. 11, 2021, now Pat. No. 11,794,778.

(51) Int. Cl.

*G06T 7/73* (2017.01)
*G01S 15/08* (2006.01)
*G06V 10/20* (2022.01)

(52) U.S. Cl.

CPC ................ *G06T 7/74* (2017.01); *G01S 15/08* (2013.01); *G06V 10/255* (2022.01)

(58) Field of Classification Search

CPC .......... B60T 7/18; G05D 1/225; G05D 1/249; G05D 2107/82; G05B 2219/40477; (Continued)

(56) References Cited

U.S. PATENT DOCUMENTS 9,734,712 B1 * 8/2017 Lai .......................... B61L 27/04
2013/0151133 A1 * 6/2013 Kickbusch .............. B61L 27/57 701/117

(Continued)

FOREIGN PATENT DOCUMENTS

WO WO 2019151704 A1 * 8/2019 ........... H04N 13/239

OTHER PUBLICATIONS

B. Lv et al., "LiDAR-Enhanced Connected Infrastructures Sensing and Broadcasting High-Resolution Traffic Information Serving Smart Cities," in IEEE Access, vol. 7, pp. 79895-79907, 2019, doi: 10.1109/ACCESS.2019.2923421. (Year: 2019).*

*Primary Examiner* — Chan S Park
*Assistant Examiner* — Chandhana Pedapati
(74) *Attorney, Agent, or Firm* — K&L Gates LLP

(57) ABSTRACT

A system and method include one or more processors and a communication device. The one or more processors are configured to receive sensor signals output by an observer device that monitors a route area. The one or more processors analyze the sensor signals to determine a distance of a vehicle within the route area from the observer device, and determine a vehicle location of the vehicle based on the distance and a predetermined location of the observer device. The communication device is configured to communicate the vehicle location to at least one of the vehicle or a remote control device that is off-board the vehicle.

18 Claims, 3 Drawing Sheets

(58) Field of Classification Search
CPC ....... G05B 2219/40476; B61L 15/0018; B61L 2205/04; B61L 25/025; B61L 27/40; B61L 25/026; B61L 23/041; B61L 27/20; B61L 25/04; G01S 2013/9325; G01S 15/86; G01S 17/86; G01S 15/08; G01S 17/08; G06T 7/74; G06V 10/255; G06V 20/54; G06V 20/58
See application file for complete search history.

(56) References Cited

U.S. PATENT DOCUMENTS

| | | | | |
|---|---|---|---|---|
| 2016/0046308 | A1* | 2/2016 | Chung | B61L 27/04 701/20 |
| 2016/0194014 | A1 | 7/2016 | Rajendran | |
| 2018/0056792 | A1* | 3/2018 | Vance | B61L 3/121 |
| 2019/0146520 | A1* | 5/2019 | Naithani | B61L 23/042 701/28 |
| 2020/0158815 | A1 | 5/2020 | Staats et al. | |
| 2020/0349498 | A1 | 11/2020 | Brooks et al. | |
| 2021/0094595 | A1* | 4/2021 | Kälberer | B61L 25/025 |
| 2022/0012496 | A1* | 1/2022 | Hagio | H04Q 9/00 |
| 2024/0011797 | A1* | 1/2024 | Helfrich | B60W 50/035 |

* cited by examiner

VEHICLE LOCATION DETERMINING SYSTEM AND METHOD

CROSS-REFERENCE TO RELATED APPLICATIONS

This application claims priority to and is a continuation-in-part of U.S. patent application Ser. No. 17/174,065, filed Feb. 11, 2021, and the entire disclosure of which is incorporated herein by reference.

BACKGROUND

Technical Field

The subject matter herein relates to systems that determine vehicle locations. Discussion of Art.

Vehicle location tracking can be used to map the current locations of multiple vehicles in a region to predict or anticipate potential collisions and implement avoidance measures, thereby increasing safety. Such vehicle tracking can also be used to improve vehicle travel efficiency and throughput by, for example, notifying vehicles to avoid traffic congestion. The benefits of vehicle tracking will increase as vehicles transition to semi and fully autonomous control. Vehicle tracking relies on accurate knowledge of the specific location of each vehicle being tracked. Typically, the location of a vehicle is determined using a location determining device disposed onboard the vehicle, such as a global navigation satellite system (GNSS) receiver that receives signals from one or more satellites. One example of a GNSS receiver is a global positioning system (GPS) receiver that receives signals that are relatively accurate and are generally acceptable means of vehicle location determination that are used by vehicle tracking systems.

In some circumstances, GNSS communications may not be available due to electromagnetic interference and/or obstacles that block the communication pathway with the onboard GNSS receiver. Examples of obstacles that may block GNSS communications include tall buildings, tunnels, overhead structures such as roofs and coverings, mountains, canyons, and the like. When GNSS reception is not available, the location of the vehicle may not be accurately and reliably determined, so some systems that rely on tracking the vehicle location may not be able to operate as desired. Existing alternative options for determining the vehicle location are less reliable and/or less accurate than GNSS tracking. One alternative uses GNSS repeater devices, but the GNSS repeater only provides the location of the repeater so does not accurately reflect the actual location of the vehicle.

It may be desirable to have a system and method for determining vehicle location that does not rely on GNSS such that the system and method are not susceptible to reception issues, yet provides comparable vehicle location accuracy as GNSS tracking.

BRIEF DESCRIPTION

In one or more embodiments, a system (e.g., a vehicle location determining system) is provided that includes one or more processors and a communication device. The one or more processors are configured to receive sensor signals output by an observer device that monitors a route area. The one or more processors are configured to analyze the sensor signals to determine a distance of a vehicle within the route area from the observer device, and to determine a vehicle location of the vehicle based on the distance and a predetermined location of the observer device. The communication device is communicatively connected to the one or more processors and configured to communicate the vehicle location to at least one of the vehicle or a remote control device that is off-board the vehicle.

In one or more embodiments, a method (e.g., for determining a vehicle location) is provided that includes receiving sensor signals output by an observer device that monitors a route area, and detecting a presence of a vehicle within the route area. The method includes analyzing the sensor signals to determine a distance of the vehicle from the observer device, and determining a vehicle location of the vehicle based on the distance and a predetermined location at which the observer device is mounted. The method includes generating a message, comprising the vehicle location, to be communicated to at least one of the vehicle or a remote control device that is off-board the vehicle.

In one or more embodiments, a wayside monitoring assembly is provided that includes a camera, one or more processors, and a communication device. The camera is configured to be mounted proximate one or more routes and oriented to monitor a route area including at least one route of the one or more routes. The one or more processors are configured to analyze image data generated by the camera to detect a presence of a vehicle within the route area and determine a distance of the vehicle from the camera. The one or more processors are configured to determine a vehicle location of the vehicle based on the distance and a predetermined location at which the camera is mounted. The communication device is configured to communicate the vehicle location to at least one of the vehicle or a remote control device off-board the vehicle.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
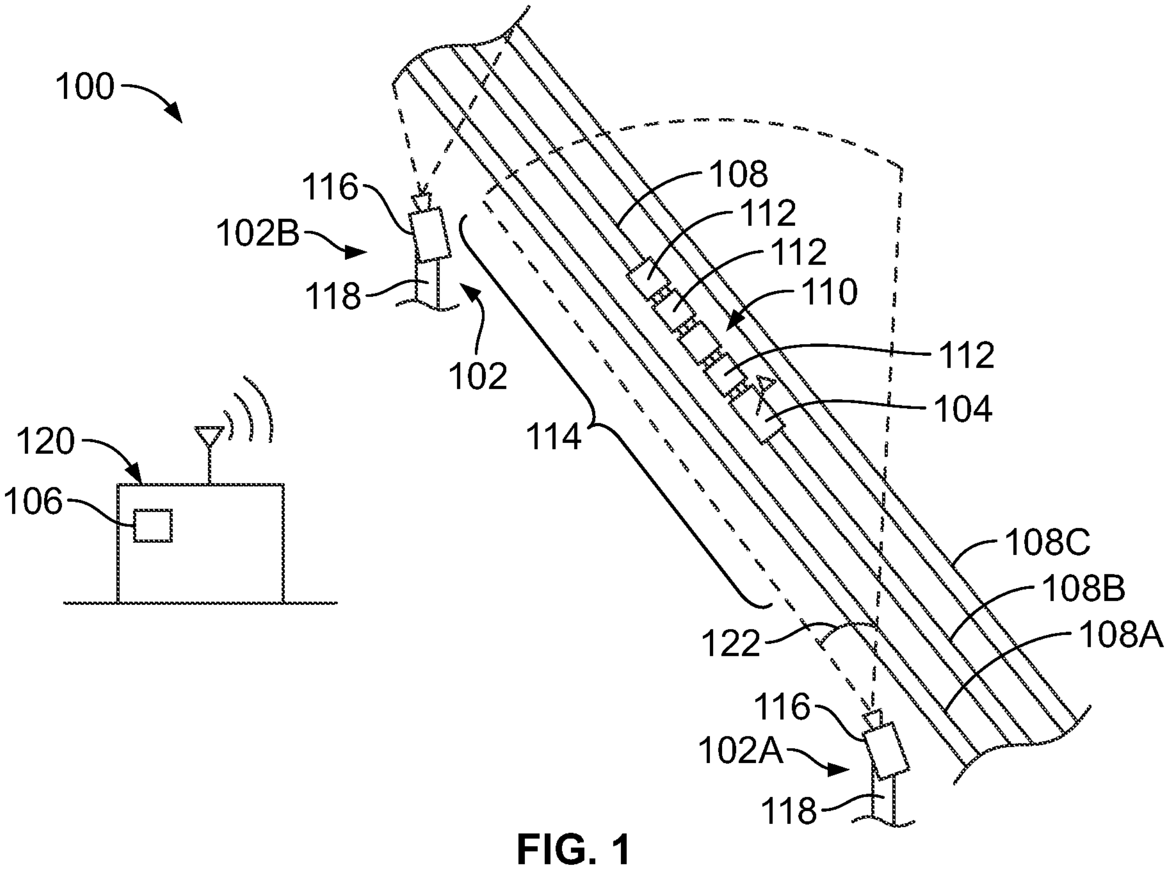
FIG. 1 illustrates a vehicle location determining system according to an embodiment.

Embodiments described herein are directed to a system and method for determining a location of a vehicle. The system is referred to herein as a vehicle location determining system. More specifically, the system and method are able to determine the vehicle location even when satellite-based communications, such as GNSS, are unavailable. The system and method can utilize sensors and/or other hardware to indirectly calculate the location of a vehicle based on predetermined knowledge of the location of the sensors and/or other hardware. For example, the location determining system disclosed herein includes at least one observer device that is mounted at a predetermined location, such as an absolute location that can be represented by position coordinates in a coordinate system. The observer device may be mounted on a wayside structure, such as a post or building, and oriented to monitor at least one route. By analyzing sensor signals generated by the observer device, the location determining system can detect the presence of a vehicle on the at least one route and determine a distance from the vehicle to the mounted location of the observer device (e.g., which represents a relative location of the vehicle). Both the relative location of the vehicle and the predetermined location of the observer device can be analyzed to estimate, with relatively high accuracy, the vehicle location. The vehicle location may be an absolute location that can be represented by position coordinates in a coordinate system.

The vehicle location that is determined by the system and method disclosed herein can be used by a vehicle network control system that tracks the location and/or movement of the vehicle. Such a vehicle network control system may be configured to increase safety, movement efficiency, and/or throughput along a region of routes by providing situational awareness achievable through the tracking of multiple vehicles. The vehicle network control system may communicate information to one or more vehicles, such as speed limits, route segment occupancy statuses (e.g., segment "A" is unoccupied, segment "B" is occupied, etc.), slow orders due to maintenance or emergencies, and/or the like. The vehicles may have onboard control devices that analyze the received information and control the movement of the vehicles along the routes to comply with relevant movement restrictions included in the information.

In one or more embodiments, the vehicle location that is determined by the vehicle location determining system may be used to request permission from the vehicle network control system to allow the vehicle to move along a route that the vehicle occupies. For example, a stationary vehicle that intends to start traveling on a scheduled trip may first communicate an initialization message to a remote control device that is off-board the vehicle. The initialization message may be generated to include the vehicle location. The vehicle location may be determined by the vehicle location determining system as described herein, based on signals received by a GNSS receiver, and/or the like. The initialization message may inform the remote control device that the vehicle is stationary, is located at a specific set of positional coordinates, and intends to start moving along the route. Upon receipt, the remote control device may begin tracking the movement of the vehicle. To confirm that the initialization message has been successfully received, the remote control device may communicate a confirmation message back to the vehicle. Optionally, the confirmation message may include additional information, such as a grant of permission for the vehicle to move along the route, one or more movement restrictions related to speed or distance that the vehicle is permitted to travel, and/or one or more occupancy statuses for route segments (e.g., blocks) proximate to the vehicle.

Without the vehicle location determining system and method disclosed herein, when GNSS reception is not available a control system that relies on vehicle location may not be able to initialize at all or may initialize in a restricted mode that provides reduced performance or operations relative to an unrestricted mode. In a non-limiting example, the vehicle location can be used to initialize a positive vehicle control system prior to starting a trip of the vehicle. The positive vehicle control system may be configured to prevent the vehicle from entering a route segment, moving faster than a designated speed, and/or the like, unless a signal is received from an off-board source of the positive vehicle control system granting permission to the vehicle to enter into the route segment, move faster than the designated speed, and/or the like.

One or more technical effects of the embodiments described herein are providing vehicle location determination that is independent of satellite-based communications, such that the location can be determined without reliance on GNSS reception. For example, the vehicle location determining system can be installed in areas that are known to have no GNSS reception or unreliable GNSS reception, such as in covered vehicle yards and stations, urban canyons that are surrounded by tall buildings, tunnels, mountainous geographic regions, and/or the like. As such, GNSS signals can be used when available, and the vehicle location determining system can be used in specific areas where GNSS is unavailable to avoid lapses in vehicle location determination. Another technical effect of the embodiments described herein is to provide relatively accurate and reliable vehicle location determination that is comparable to GNSS-based tracking. The accuracy achieved may be greater than the accuracy of other methods for determining vehicle location, such as calculating locations based on GNSS repeaters.

FIG. 1 illustrates a vehicle location determining system 100 according to an embodiment. The vehicle location determining system includes at least one wayside monitoring assembly 102 that monitors a route area 114. The vehicle location determining system 100 may include a remote control device 106 that is communicatively connected to the at least one wayside monitoring assembly. Two wayside monitoring assemblies 102A, 102B are shown in FIG. 1. A first wayside monitoring assembly 102A monitors the route area 114 shown in FIG. 1, and a second wayside monitoring assembly 102B monitors another route area. The wayside monitoring assemblies and the remote control device are disposed off-board a vehicle 104 that occupies one specific route 108 in the route area. Different vehicles and different numbers of vehicles may be within the route areas at different times. The wayside monitoring assemblies can communicate with the vehicle or vehicles within the route areas. In one or more embodiments, the communications between the wayside monitoring assemblies, the vehicle, and/or the remote control device are wireless. In an alternative embodiment, at least one of the wayside monitoring assemblies may be connected to the remote control device via a physical communication pathway, such as an electrical wire or an optical wire. In the illustrated embodiment, the route area monitored by the first wayside monitoring assembly encompasses multiple routes 108A, 108B, 108C. The routes may be disposed in parallel along at least a portion of the route area. In FIG. 1, the vehicle occupies the middle route 108B, and the other two routes 108A, 108C are unoccupied along the illustrated segments of the routes.

In a non-limiting example, at least one of the wayside monitoring assemblies determines a location of the vehicle on the route (e.g., a vehicle location) and communicates the vehicle location to the vehicle. The vehicle location may be communicated to the remote control device. The remote control device may grant permission to the vehicle to move along the route based on the vehicle location information received. One or more of the wayside monitoring assemblies may be positioned to monitor sections of the routes that are associated with poor or unreliable GNSS reception, such as sections that would block or otherwise interfere with satellite-based communications. The wayside monitoring assemblies may be installed under roofs or other coverings, along urban canyons surrounded by tall buildings in cities, within underground tunnels and/or stations, within natural canyons between mountains, and/or the like. Optionally, at least some of the wayside monitoring assemblies may not be installed in open areas that are associated with good, reliable GNSS reception because the locations of the vehicles can be determined used the onboard GNSS receivers. In one or more embodiments, the vehicle location determining system is independent of GNSS and other satellite-based communication systems, and can be utilized in conjunction with GNSS or instead of GNSS. For example, when a vehicle is in an area that has good, reliable GNSS reception, GNSS can be used to determine the vehicle location. When the vehicle enters an area that has poor, unreliable GNSS reception, the wayside monitoring assemblies of the vehicle location determining system can be used in lieu of GNSS to provide the vehicle location without providing a substantial drop in location accuracy or reliability. For example, the accuracy and reliability of the vehicle location determining system may be comparable to the location accuracy of GNSS in good reception areas, such as the same or slightly better than GNSS.

The vehicle 104 shown in FIG. 1 may be a component of a vehicle system 110 that includes multiple vehicles. The vehicle 104 may be a propulsion-generating vehicle that includes one or more traction motors, combustion engines, and/or the like for generating tractive effort to propel the vehicle system along the route. The vehicle system optionally may include one or more non-propulsion-generating vehicles 112 that are mechanically coupled to the propulsion-generating vehicles and propelled by the propulsion-generating vehicles. The vehicle system may represent a vehicle platoon, swarm, and/or consist (collectively "consist"). Suitable vehicle consists may include a rail vehicle consist (e.g., train) having both propulsion-generating vehicles and non-propulsion-generating vehicles mechanically coupled together by couplers (and may optionally be electrically connected together). In one embodiment, the vehicle system is formed from the single propulsion-generating vehicle and multiple non-propulsion-generating vehicles that are pulled by the propulsion-generating vehicle. In another embodiment, the vehicle system can include multiple propulsion-generating vehicles. Optionally, at least some of the multiple propulsion-generating vehicles may be physically separate from each other but logically coupled with each other to enable communication among the vehicles to coordinate their movements (so that the vehicles move together as a convoy).

Various embodiments shown and described herein are directed to rail-based vehicles. For example, the vehicle 104 may be a locomotive, and the non-propulsion-generating vehicles 112 may be rail cars that carry passengers, cargo, or the like. The routes may be railroad tracks. While one or more embodiments are described in connection with rail vehicle systems, not all embodiments are limited to rail vehicle systems. The vehicle location determining system can also be used for determining the location of other types of vehicles instead of, or in addition to, rail vehicles. Unless expressly disclaimed or stated otherwise, the subject matter described herein extends to other types of vehicle systems, such as automobiles, trucks (with or without trailers), buses, marine vessels, aircraft, mining vehicles, agricultural vehicles, or other off-highway vehicles.

The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy). In an embodiment, the vehicle may be remote-controlled. For example, the vehicle may be controlled at least in part by the remote control device that is off-board the vehicle. In another embodiment, the vehicle may be autonomous. Optionally, the vehicle may include a human operator onboard that can control vehicle movement.

Each wayside monitoring assembly includes an observer device 116 that is configured to monitor a route area 114. The route area includes a length or segment of at least one route. In the illustrated embodiment, the route area monitored by the wayside monitoring assembly 102A includes a length of each of the three routes. For example, the observer device is mounted and oriented such that a field of view of the observer device encompasses the route area to detect vehicles within the route area. The observer device may be positioned such that the route area is relatively expansive, such as extending hundreds or thousands of meters along the monitored routes. For example, the wayside monitoring assembly may be located proximate to the routes, and the observer device may be oriented relatively parallel to the length of the routes. The size of the route area that is monitored by the observer device may be limited by properties of the observer device, such as the resolution at long distances and the viewing angle at short distances. Optionally, at shown in FIG. 1, multiple wayside monitoring assemblies can be installed at different locations along the length of the routes to monitor different route areas of the same routes. In an example, at least some of the route areas monitored by the multiple wayside monitoring assemblies may overlap. For example, a first route area may be an area of the route that is monitored by both a first wayside monitoring assembly and a second wayside monitoring assembly.

Each wayside monitoring assembly may include a structure 118 on which the observer device is mounted. The structure may be a permanent or semi-permanent fixture, such as a building or a pole (e.g., utility pole, light pole, etc.) or post that is installed in the ground. The structure may be proximate to the routes, such as within 20 m, 10 m, or 5 m of the routes. The observer device may be mounted to the structure at a height that is above the heights of the vehicles that travel on the routes to enable the observer device to monitor the routes from an elevated perspective. For example, the observer device may be mounted 7 m, 10 m, 12 m, or the like above the ground (e.g., the routes).

The observer device monitors the route area by generating sensor signals that indicate activity and/or occupancy within the route area. The sensor signals may be image data that depicts the route area, modified waveforms that reflect back to the observer device, and/or the like. The sensor signals generated by the observer device may be used to detect when a vehicle is present in the route area, identify the specific (e.g., particular) route that is occupied by the vehicle, identify the vehicle (relative to one or more other vehicles), and/or determine a distance of the vehicle from the observer device.

In an embodiment, the observer device includes or represents a camera that generates image data within a respective field of view 122 of the camera. The route area may be the portion of the routes that is within the field of view of the camera and within a designated distance of the camera that is associated with satisfactory image data resolution to perform vehicle detection and identification, as described herein. The image data may be in the visible wavelength range and/or the infrared wavelength range of the electromagnetic spectrum. The image data may represent video at a designated frame per second rate. Optionally, the image data may represent still images generated at a designated frequency, such as one image every second, every two seconds, every half second, or the like. The frame rate of the video or the frequency of the still images may be based on application-specific parameters, hardware capability, and/or a permitted speed along the route in the area. For example, a camera may acquire video at a greater frame rate for a route segment with a greater upper speed limit than for a route segment with a lower speed limit to ensure that each mobile asset is captured in at least one frame of the image data. The image data can then be analyzed to identify all of the vehicles that travel through the route area.

In one embodiment, the observer device includes only the camera. In another embodiment, the observer device includes another sensor device in addition to the camera, such as an ultrasonic distance sensor and/or an optical distance sensor. The optical distance sensor may include laser rangefinders. In a third embodiment, the observer device includes an ultrasonic distance sensor and/or an optical distance sensor, but does not include a camera. The sensor signals generated by the observer device can be waveform differential signals generated by the distance sensor(s).

The location of each wayside monitoring assembly (e.g., the observer device thereof) is predetermined (prior to determining the vehicle location). For example, upon installing the wayside monitoring assembly, the crew may determine an absolute location of the wayside monitoring assembly. The absolute location may be represented by positional coordinates in a coordinate system. For example, a survey may be performed to calculate the longitude and latitude coordinates of each wayside monitoring assembly. One way to determine the absolute location of the wayside monitoring assembly is to position a GNSS receiver in the vicinity (e.g., within 100 m) of the wayside monitoring assembly in an area in which the GNSS receiver can communicate with the satellites. For example, the GNSS receiver may be mounted on or above a roof, a building, or a mountain above the wayside monitoring assembly. After determining the positional coordinates of the GNSS receiver using GNSS signals, the offset between GNSS receiver and the wayside monitoring assembly can be measured. For example, the distance and angle between the GNSS receiver and the wayside monitoring assembly can be measured, and such offset data can be combined with the positional coordinates of the GNSS receiver to determine the positional coordinates of the wayside monitoring assembly. The positional coordinates of the wayside monitoring system can represent the predetermined location (e.g., predetermined absolute location) of the observer device. If the wayside monitoring assembly is stationary and fixed in place, the predetermined location of the observer device is static, and can be stored in a database within a memory storage device.

The predetermined location of the observer device can be used to determine the vehicle location of the vehicle that is in the route area, as described herein. After the vehicle location is determined, the vehicle location can be communicated, such as to the vehicle and/or the remote control device off-board the vehicle. The vehicle location can be used for tracking the vehicle.

In a specific example, the vehicle location can be used for initializing a control system that is designed to improve the safety and/or efficiency of vehicle travel. During operation, the vehicle location determining system, or a wayside monitoring assembly or control device thereof, may send data to a back office, such as a positive vehicle control (PVC) system for use in evaluating functionality or health of the wayside monitoring assembly, the vehicle, or both. The PTC system is one example of a PVC system. A PVC system can be a system that monitors locations of vehicles and vehicle systems, movements of the vehicles and/or vehicle systems, maintenance personnel, damaged segments of routes, segments of routes undergoing maintenance, route layouts, or the like. Such a system issues signals to onboard components of the vehicles to restrict how fast the vehicles can travel, which segments of routes that the vehicles can enter into (due to the presence or absence of other vehicles or vehicle systems in the segments, maintenance in the segments, damaged segments, etc.), and the like. Absent receiving such a signal, the onboard component of a vehicle or vehicle system will operate to automatically stop or prevent the vehicle or vehicle system from entering into an upcoming segment of a route. Once a signal is received granting permission to the vehicle or vehicle system, the onboard component of the vehicle or vehicle system may allow the vehicle or vehicle system to enter into the upcoming segment. Another example of such a system is a negative vehicle control (NVC) system. This system can be a system that monitors locations of vehicles and vehicle systems, movements of the vehicles and/or vehicle systems, maintenance personnel, damaged segments of routes, segments of routes undergoing maintenance, route layouts, or the like. The NVC system issues signals to onboard components of the vehicles to restrict how fast the vehicles can travel, which segments of routes that the vehicles can enter into (due to the presence or absence of other vehicles or vehicle systems in the segments, maintenance in the segments, damaged segments, etc.), and the like. In contrast to the PVC system, with the NVC system, absent receiving a signal from the NVC system, the onboard component of a vehicle or vehicle system will allow the vehicle or vehicle system to enter into an upcoming segment of a route. The NVC system will issue a signal to instruct the onboard component to prevent the vehicle or vehicle system from entering into the upcoming segment.

For example, the remote control device off-board the vehicle may represent a portion of a PVC system configured to prevent the vehicle from moving along the route unless the remote control device grants permission to the vehicle to move along the route. The PVC system may also prevent the vehicle from entering a route segment (e.g., block) and/or moving faster than a designated speed unless a signal is communicated from the remote control device to the vehicle that grants permission to enter the route segment and/or move faster than the designated speed. Another portion of the PVC system may be disposed onboard the vehicle. For example, the onboard portion of the PVC system may package the vehicle location that is determined into a request message that is communicated to the remote control device to initialize the PVC system. In an embodiment in which the vehicle is a rail-based vehicle, the PVC system may be a positive train control (PTC) system.

The remote control device may require receipt of the vehicle location before allowing the vehicle to move from a stationary position. Otherwise, if the vehicle location is not available and/or is not communicated to the remote control device, the remote control device may not be able to protect the vehicle. Stated differently, without successful initialization of the positive vehicle control system due to the lack of an accurate, reliable vehicle location, the movements of the vehicle may not be tracked or permitted by the positive vehicle control system. In another embodiment, the remote control device may be a portion of an NVC system that allows the vehicle to move, enter a route segment, move faster than a designated speed, or the like, unless the remote control device generates a message that is communicated to the vehicle to prohibit the vehicle from moving, entering the route segment, and/or moving faster than the designated speed. The remote control device may be located at an off-board facility 120, such as dispatch facility, a cloud storage facility, or the like.

Figure 2:
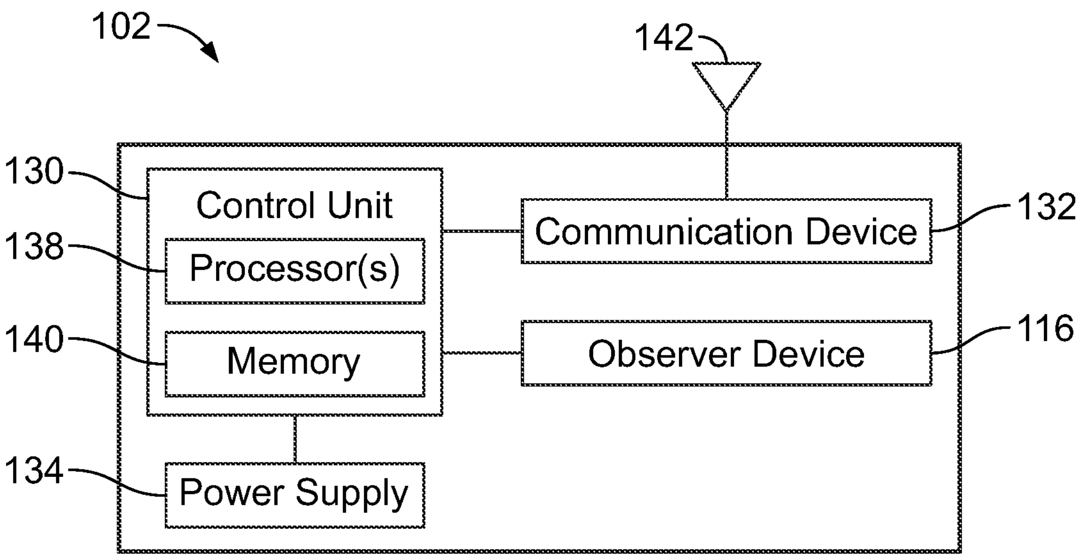
FIG. 2 is a block diagram of one wayside monitoring assembly of the vehicle location determining system according to an embodiment.

FIG. 2 is a block diagram of one wayside monitoring assembly 102 of the vehicle location determining system according to an embodiment. The wayside monitoring assembly 102 includes the observer device 116, a control unit (referred to herein as wayside control unit) 130, a communication device 132, and a power supply 134. These components may be mounted to the structure 118 shown in FIG. 1, such as a pole, post, building, cart, or the like.

The wayside control unit is communicatively connected to the observer device and the communication device. The wayside control unit may be conductively connected to the observer device and the communication device via electrical wires, contactors, optical cables, circuit traces, or the like. Alternatively, the wayside control unit may be wirelessly connected to the observer device and/or the communication device via inductive coupling and/or RF transmitters. The wayside control device receives and analyzes the sensor signals generated by the observer device. The wayside control device may generate control signals for controlling operations of components of the wayside monitoring assembly. The wayside control device may generate messages to be remotely communicated by the communication device, and may receive messages that are received by the communication device. The wayside control device represents hardware circuitry that may include and/or may be connected with one or more processors 138 (e.g., one or more microprocessors, integrated circuits, microcontrollers, field programmable gate arrays, etc.).

The wayside control unit may include and/or may be connected with a tangible and non-transitory computer-readable storage medium (e.g., memory) 140. The memory may include one or more computer hard drives, flash drives, RAM, ROM, EEPROM, and the like. For example, the memory may store programmed instructions (e.g., software) that may be executed by the one or more processors to perform the operations of the wayside control unit described herein, such as operations for detecting the presence of a vehicle in the route area that is monitored by the observer device, identifying a route that the vehicle is occupying, identifying the vehicle, determining a distance of the vehicle from the observer device, and/or determining a vehicle location of the vehicle. Alternatively, at least some instructions that direct operations of the processors may be hard-wired into the logic of the control circuitry of the wayside control unit, such as by being hard-wired logic formed in programmable gate arrays (fpga), complex programmable logic devices (cpld), and/or other hardware. The memory additionally or alternatively may store different information, such as a record of sensor signals/data generated by the observer device, a log of vehicles detected in the route area, the predetermined location of the observer device, control instructions for communicating the vehicle location and/or notifications or alerts to various recipients, and/or the like.

The communication device can represent circuitry that can communicate electrical signals wirelessly and/or via wired connections. For example, the communication device can represent transceiving circuitry, one or more antennas 142, modems, or the like. The transceiving circuitry may include a transceiver or discrete transmitter and receiver devices. The electrical signals can form data packets that in the aggregate represent messages. In various embodiments, the one or more processors of the wayside control unit can generate messages that are communicated remotely by the communication device. At least some of the messages that are generated can include the vehicle location of a vehicle detected within the route area, as determined (e.g., calculated) by the wayside control unit based on the sensor signals generated by the observer device. The communication device can also receive messages and forward the messages to the one or more processors of the wayside control unit for analysis of the received messages.

The power supply may power one or more components of the wayside monitoring assembly, such as the observer device, the control unit, and/or the communication device. The power supply may include one or more electrical energy storage devices, such as battery cells. The power supply may include additional hardware components, such as a charger for recharging the battery cells. Alternatively, or in addition, the power supply may include a power cable that plugs into a power source, such as a photovoltaic cell that is mounted on the structure, a wind turbine, or a power grid. The photovoltaic cell may be a component of the wayside monitoring assembly. The wayside monitoring assembly may also include other components, such as a light source to illuminate the route area in dark or dim conditions (e.g., at night), a display device to provide visual messages to operators and vehicles nearby, and/or an audio speaker device to emit audible messages to operators and vehicles nearby.

Figure 3:
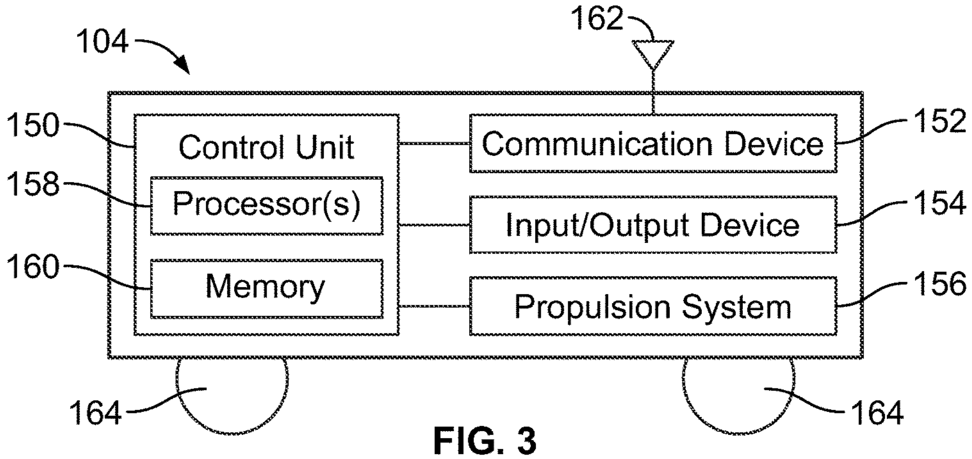
FIG. 3 is a block diagram of a vehicle that occupies a route monitored by one of the wayside monitoring assemblies of the vehicle location determining system according to an embodiment.

FIG. 3 is a block diagram of a vehicle 104 that occupies a route within the route area that is monitored by one or more of the wayside monitoring assemblies of the vehicle location determining system according to an embodiment. The vehicle includes a control unit (referred to herein as vehicle control unit) 150, a communication device 152 (referred to herein as onboard communication device), an input/output device 154, and a propulsion system 156. These components are disposed onboard the vehicle system. For example, all of the components may be onboard the same vehicle or the components may be distributed among multiple vehicles of the vehicle system.

The vehicle control unit is communicatively connected to the onboard communication device, the input/output device, and the propulsion system via wired and/or wireless communication pathways. The vehicle control unit may generate control signals for controlling operations of the components of the vehicle. The vehicle control unit may generate messages to be remotely communicated by the onboard communication device and may receive messages that are received by the onboard communication device. For example, the vehicle control device may receive, via the onboard communication device, messages sent by the wayside monitoring assembly that include the location of the vehicle as determined by the wayside monitoring assembly. The vehicle control device may include the received vehicle location in a message that is communicated remotely, such as to the remote control device shown in FIG. 1. The message may be a status message that enables the remote control device to track the vehicle progress along the route, an initialization request message that requests the remote control device to permit the vehicle to move along the route from a stationary state, or the like. The vehicle control unit represents hardware circuitry that may include and/or may be connected with one or more processors 158 (e.g., one or more microprocessors, integrated circuits, microcontrollers, field programmable gate arrays, etc.). The vehicle control unit may include one or more control devices.

The vehicle control unit may include and/or may be connected with a tangible and non-transitory computer-readable storage medium (e.g., memory) 160. The memory may include one or more computer hard drives, flash drives, RAM, ROM, EEPROM, and the like. For example, the memory may store programmed instructions (e.g., software) that may be executed by the one or more processors to perform the operations of the vehicle control unit, such as operations for generating messages to be sent to the remote control device. Alternatively, at least some instructions that direct operations of the processors may be hard-wired into the logic of the control circuitry of the vehicle control unit, such as by being hard-wired logic formed in programmable gate arrays (fpga), complex programmable logic devices (cpld), and/or other hardware. The memory additionally or alternatively may store different information, such as a route database, a trip plan, and/or the like.

The onboard communication device can represent circuitry that can communicate electrical signals wirelessly and/or via wired connections. For example, the communication device can represent transceiving circuitry, one or more antennas 162, modems, or the like. The transceiving circuitry may include a transceiver or discrete transmitter and receiver devices. The electrical signals can form data packets that in the aggregate represent messages.

The propulsion system may include one or more traction motors connected with axles and/or wheels 164 of the vehicle via one or more gears, gear sets, or other mechanical devices to transform rotary motion generated by the traction motors into rotation of the axles and/or wheels. The propulsion system includes at least one prime mover for powering the traction motors to propel the vehicle. The prime mover may be a combustion engine (e.g., diesel engine), a battery pack or other energy storage system, and/or the like. The combustion engine may be coupled to an alternator to supply electrical energy for powering the one or more traction motors. In a regenerative braking state, the traction motors may supply electric current generated based on the rotation of the wheels and/or axles for charging energy storage devices (e.g., battery cells) of the energy storage system.

The input/output device can include one or more operator input devices, such as a keyboard, mouse, touchscreen, microphone, or the like for enabling an onboard human operator to enter control commands to the vehicle control unit. The input/output device may include one or more output devices for presenting information to the operator onboard, such as a speaker, a display screen, lights, and/or the like. In an embodiment in which the vehicle is fully automated or fully remotely controlled such that no human operator is present onboard the vehicle, the vehicle optionally may lack the input/output device.

Figure 4:
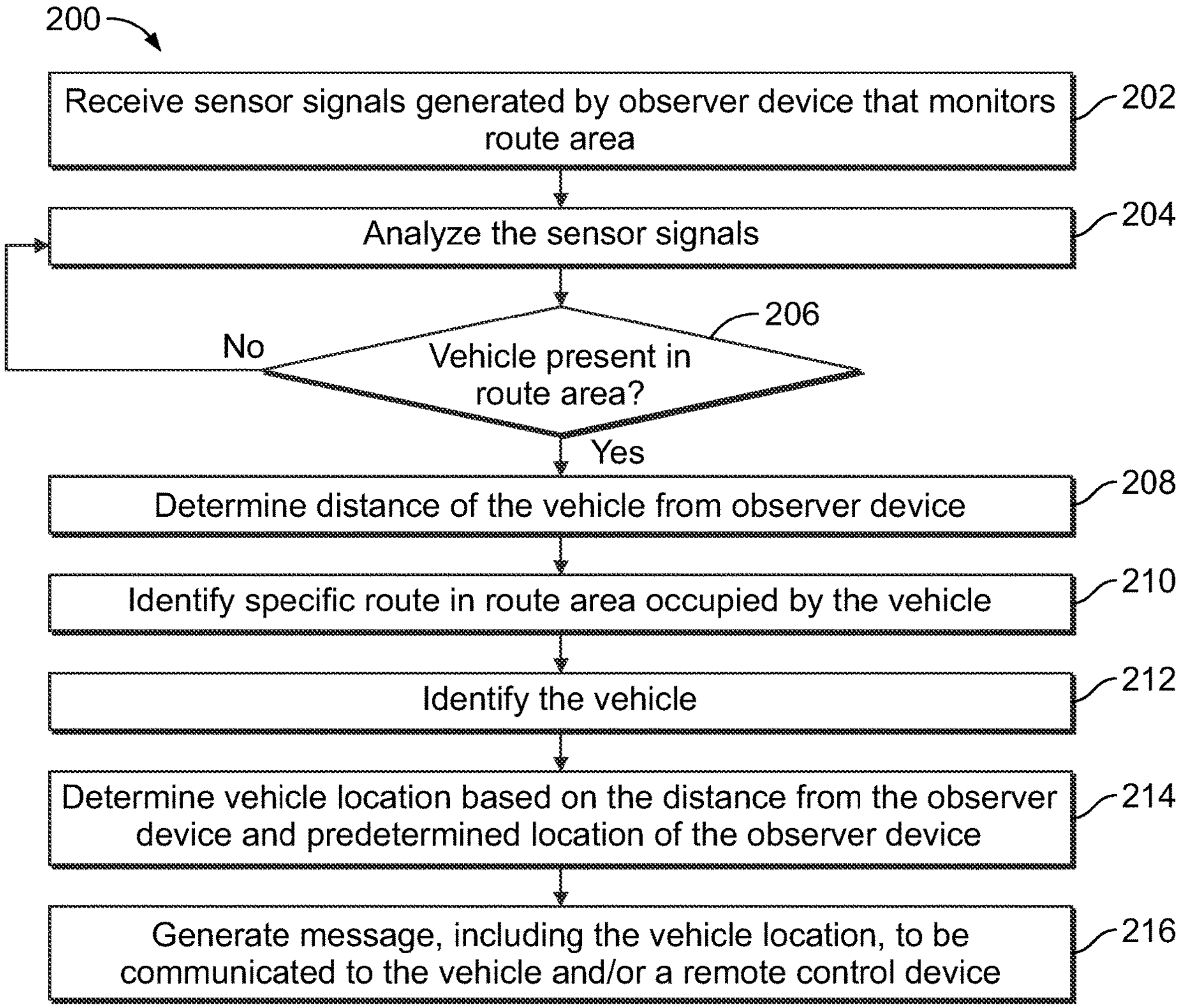
FIG. 4 is a flow chart of a method for determining a location of a vehicle according to an embodiment.

FIG. 4 is a flow chart 200 of a method for determining a location of a vehicle according to an embodiment. Various steps of the method may be performed by the one or more processors 138 of the wayside control unit 130 of the wayside monitoring assembly 102 shown in FIGS. 1 and 2. The method may include additional steps than shown in FIG. 4, fewer steps than shown in FIG. 4, and/or different steps than at least some of the steps shown in FIG. 4.

At step 202, sensor signals generated by the observer device 116 are received. The observer device monitors a route area including at least one route. The observer device in an embodiment includes or represents a camera that generates (e.g., captures) image data of the route area as the sensor signals. The sensor signals may be received periodically over time, such as every second, every 5 seconds, every 10 seconds, every 30 seconds, or the like. Alternatively, the sensor signals may be received on demand, such as in response to the wayside control unit generating a control signal to prompt the observer device to generate one or more sensor signals.

At step 204, the sensor signals are analyzed. At 206, it is determined whether a vehicle is present in the route area that is monitored by the observer device based on the analysis of the sensor signals. In an embodiment in which the sensor signals include image data, the wayside control unit may employ at least one image analysis technique or algorithm to detect whether any vehicle is depicted within the route area. For example, the wayside control unit may include machine learning (e.g., a neural network or other artificial intelligence), such that the wayside control unit is trained to identify vehicles present in the image data and discern when vehicles are not present in the image data. Optionally, the detection of the vehicle in the route area may be based on other image analysis techniques, such as pixel intensity gradients. In another embodiment, the vehicle may be detected based on proximity signals generated by the observer device. For example, the observer device may include at least one sensor that emits electromagnetic or acoustic pulses and analyzes received waveforms, as well as the time delay from emission to receipt, to detect if the waveforms have reflected off of a vehicle within the route area.

If no vehicle is detected as present within the route area, then the method returns to step 204 and newly-generated sensor signals are analyzed. On the other hand, if a vehicle is positively detected, then the method proceeds to step 208. At step 208, a distance of the vehicle from the observer device is determined. The distance may refer to a length of a straight line segment that extends from the observer device to the vehicle. In an embodiment, the image data generated by a camera of the observer device can be analyzed by the wayside control unit using a scaling algorithm to determine (e.g., estimate, calculate, etc.) the relative distance between the observer device and the vehicle that is detected in the route area. The wayside control unit may use the pixels in the image data to determine a size of one or more aspects of the graphical representation of the vehicle in the image data. For example, the wayside control unit may detect, using edge detection or the like, that a width of the vehicle in the image data is three pixels. Then, using a predetermined calibration between pixel size and actual vehicle widths, the wayside control unit may calculate an estimated distance of the vehicle from the camera.

The predetermined calibration may be based on experimental reference data. For example, a vehicle may be sequentially placed at different known distances from the camera of the observer device or another camera, and the graphical representation of the vehicle in the image data captured at each distance can be associated with the distance in a database or look-up table. The relationship between the distance and the size of the graphical representation in the image data can be quantified in a transfer function. In a non-limiting example, the image data may be two-dimensional, and the wayside control unit may perform a three-dimensional regression of the two-dimensional image data to calculate the distance. In another example, the distance may be determined by comparing the pixels depicting the vehicle to pixels depicting the background. For example, based on where the vehicle is located in the image, and how much of and/or which portions of the background environment is visible in the image, the wayside control unit can determine the distance of the vehicle from the wayside monitoring assembly.

In an alternative embodiment, the distance may be determined using an ultrasonic and/or optical distance (e.g., proximity or rangefinder) sensor of the observer device. For example, the distance sensor may emit a waveform towards the vehicle and then determine the distance of the vehicle based on the time delay until a reflected waveform is received at the distance sensor and/or based on a modification of the waveform. For example, the distance sensor may represent a laser rangefinder.

Optionally, at 210, a specific route that is occupied by the vehicle is identified. For example, some route areas may include multiple routes that are proximate to each other. The multiple routes in the route area may be parallel segments of different routes. In a non-limiting example, the wayside monitoring assembly may be located in a station, depot, or yard that accommodates multiple vehicles at the same time and has a plurality of routes proximate to each other. It may be useful to identify the specific route that is occupied by the vehicle as a means to assist in determining the vehicle location, as described herein, and/or to identify which vehicle is associated with the vehicle location that is determined. The specific route may be identified by analyzing the image data generated by the camera of the observer device. For example, the wayside control unit may have a machine learning algorithm that is trained to select the route of multiple routes depicted in the image data that is occupied by the vehicle. With reference to FIG. 1, the wayside control unit may be able to identify that there are routes 108 on both sides of the vehicle 104 in the route area, and may deduce based on this information and information from a map or database that there are only three routes in the route area, that the vehicle occupies the middle route of the three. Alternatively, other types of sensors, such as weight/force/piezoelectric sensor devices, proximity sensors, and the like, may be installed along the routes and communicatively connected to the wayside control unit for providing sensor signals that can be used to identify the specific route in the route area occupied by the vehicle.

At 212, the vehicle that is detected in the route area may be identified. In an embodiment, the vehicle may be identified relative to one or more other vehicles based on image analysis of the image data generated by the camera of the observer device. The identification may constitute a unique identification that identifies the vehicle relative to all other vehicles. For example, the identification may include detecting and deciphering a unique alphanumeric identifier displayed on the vehicle where the alphanumeric identifier is uniquely assigned to the vehicle. The alphanumeric identifier may be a license plate, a Federal Railroad Association identifier (FRA ID) string, and/or the like. In another example, if a unique alphanumeric identifier is not detected or is detected but is not decipherable, the wayside control unit may identify characteristics of the vehicle that are not a unique alphanumeric identifier. For example, the wayside control unit may analyze the sensor signals (e.g., image data) to identify a type of the vehicle, a make or model of the vehicle, a length or number of vehicles in the vehicle system, a type of cargo carried by the vehicle, a color of the vehicle, non-alphanumeric graphical indicia displayed on the vehicle, a shape of the vehicle, or the like. Such relative identifications may be combined with additional information, such as the specific route occupied by the vehicle, to determine a unique identification of the vehicle.

Figure 5:
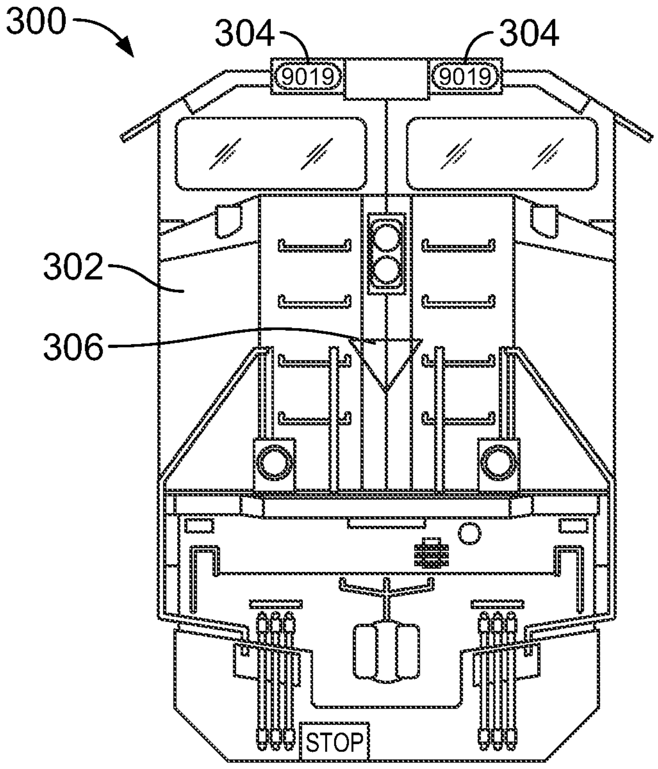
FIG. 5 illustrates an image of a vehicle according to an embodiment.

FIG. 5 illustrates an image 300 of a vehicle 302 according to an embodiment. The image may represent image data that is generated by a camera of the observer device. The wayside control unit may perform image analysis on the image to identify the vehicle. For example, the wayside control unit may determine a shape of the vehicle by performing edge detection or the like. Optionally, a machine learning algorithm may be used to determine the shape of the vehicle by inputting the image into the machine learning algorithm. The shape refers to the form factor or outline of the vehicle as depicted in the image data. Upon determining the shape, the wayside control unit may compare the shape to the shapes of known vehicles, such as different vehicle types, makes, and models. The shapes of known vehicles may be stored in a database within the memory 140 shown in FIG. 2. Upon detecting a match between the shape of the vehicle and a shape that is stored in the database, within at least a designated confidence threshold, the wayside control unit may identify the vehicle as the same type, make, and/or model as the vehicle that has the matching shape in the database. In the illustrated embodiment, the shape of the vehicle may be determined to correspond to a certain manufacturer and/or model of locomotives.

In another example, the wayside control device may analyze the image data to detect and decipher at least one graphical indicium (e.g., symbol) that is displayed on the vehicle. The graphical indicium may include an alphanumeric character string, such as an FRA ID string, an owner or operator company name, and/or the like, that is painted, bonded, adhered, or otherwise displayed on an exterior of the vehicle. The graphical indicium may also include non-alphanumeric indicia, such as logos, paint colors, paint schemes, and the like. Optionally, upon detecting the general shape of the vehicle and associating the vehicle with a known type, maker, and/or model of vehicle as described above, the wayside control device may analyze the image data in specific areas of the vehicle that typically include graphical indicia. For example, based on the identified type of vehicle, the wayside control unit may determine that a unique identifier is located near the roof of the vehicle. As a result, the wayside control unit may analyze the image data in a region near the top of the vehicle, either exclusively or at least before analyzing other regions of the vehicle depicted in the image data. Within the targeted region, the wayside control unit may analyze the image data for characters, such as letters and numbers, which are located adjacent to one another. In the illustrated embodiment, the wayside control unit may detect and then decipher the alphanumeric identifier 304 "9019". Furthermore, the wayside control unit may detect and decipher the logo 306. Both the alphanumeric identifier and the logo represent graphical indicia that can be used to identify the vehicle detected in the route area.

Referring now back to the flow chart in FIG. 4, at step 214 the vehicle location of the vehicle is determined based at least on the distance from the observer device and the predetermined location of the observer device. In an embodiment, the vehicle location is an absolute location of the vehicle within a coordinate system. The absolute location is determined by combining the predetermined absolute location of the observer device with the relative distance that is determined from the observer device to the vehicle. In at least one embodiment, the vehicle is stationary and the vehicle location is calculated in order to permit the vehicle to move along the route. When the vehicle is stationary, there is no risk of errors and uncertainties introduced by vehicle movement.

Figure 6:
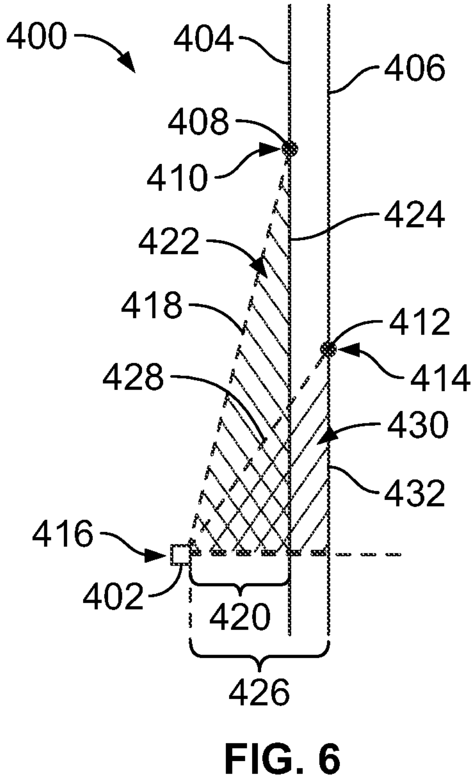
FIG. 6 illustrates a diagram showing an observer device mounted proximate to a first route and a second route according to an embodiment.

FIG. 6 illustrates a diagram 400 showing an observer device 402 mounted proximate to a first route 404 and a second route 406 according to an embodiment. The first and second routes are shown as parallel line segments in FIG. 6. The observer device 402 may be the observer device 116 shown in FIG. 1 and FIG. 2. A first vehicle 408 occupies the first route at a first vehicle location 410. A second vehicle 412 occupies the second route at a second vehicle location 414. The first and second routes are shown as parallel in the diagram, but need not be parallel. The observer device is located at a predetermined location 416. For example, the predetermined location may have positional coordinates ($x_1$, $y_1$). Both of the vehicles are within the route area monitored by the observer device.

The diagram in FIG. 6 indicates how the specific route identification can be used with the distance determination and the predetermined location of the observer device to determine the vehicle location of a corresponding vehicle. For example, as described above with reference to step 208, the wayside control unit may determine the distance 418 from the observer device to the first vehicle. As described with reference to step 210, the wayside control unit may identify that the first vehicle occupies the first route of the two routes. The observer device may be located proximate to the routes, such that a shortest device-to-route distance 420 from the observer device to the first route may be measured and stored in the memory as a predetermined value. As shown in FIG. 6, the device-to-vehicle distance 418 and the device-to-route distance 420 form two sides of a right triangle 422, specifically the hypotenuse and the short leg. The Pythagorean theorem can be used to calculate the route length 424, along the first route, from the first vehicle to the observer device. In the illustrated embodiment, the vehicle location of the first vehicle can be determined by taking the known positional coordinates of the observer device ($x_1$, $y_1$) and then adding the device-to-route distance 420 in the x-direction and the route length 424 in the y-direction. For example, the vehicle location of the first vehicle may have the positional coordinates ($x_1$+$length_{420}$, $y_1$+$length_{424}$).

Similarly, a shortest second device-to-route distance 426 from the observer device to the second route 406 may be measured and stored in the memory as a predetermined value. The wayside control unit may determine a second device-to-vehicle distance 428 from the observer device to the second vehicle, and may identify that the second vehicle occupies the second route. As shown in FIG. 6, the second device-to-route distance 426 and the device-to-vehicle distance 428 form two sides of a right triangle 430. The Pythagorean theorem can be used to calculate a second route length 432, along the second route, from the second vehicle to the observer device. In the illustrated embodiment, the vehicle location of the second vehicle can be determined by taking the known positional coordinates of the observer device ($x_1$, $y_1$) and then adding the length 426 in the x-direction and the route length 432 in the y-direction. Although not all routes may be linear as shown in FIG. 6, in general the length along the specific occupied route can be calculated from the observer device to the vehicle, and that length can be added to the positional coordinates of the observer device to determine the positional coordinates (e.g., the absolute location) of the vehicle on the route.

The vehicle locations may be determined completely independent of GNSS and other satellite communications. For example, the wayside control unit may determine the vehicle location of each vehicle in the monitored route area without using GNSS signals from a GNSS receiver. The vehicle location determining system can be used in areas where GNSS reception is unavailable or compromised.

Referring now back to the flow chart in FIG. 4, at step 216 once the vehicle location of the vehicle is determined, a message may be generated that includes the vehicle location. The message may be generated by the wayside control unit to be communicated, by the communication device 132 shown in FIG. 2, to the vehicle itself, to the remote control device off-board the vehicle, to another vehicle, and/or the like. In an embodiment, the wayside monitoring assembly may periodically broadcast location messages that are able to be received by any vehicles within range. A location message may include a vehicle identifier corresponding to the intended recipient of the message and the vehicle location of the intended recipient as determined according to the method. The vehicle identifier may include a specific route that is occupied by the intended recipient vehicle, a graphical indicium that is deciphered or detected on the intended recipient vehicle, and/or the like. For example, a location message may essentially state that the vehicle on route B which has identifier "9019" is located at positional coordinates ($x_4$, $y_9$). If other vehicles in the proximity receive that location message, such vehicles would know to ignore the message because they are not the intended recipient. If multiple vehicles are in the route area, the wayside monitoring assembly may sequentially broadcast location messages to each of the vehicles in turn. In an alternative embodiment, the wayside monitoring assembly may use the vehicle identification of the intended recipient vehicle to look up, such as in a table or address book, a specific communication pathway for transmitting the vehicle location directly to the intended recipient vehicle without broadcasting the information.

Once a vehicle receives its vehicle location from the wayside monitoring assembly, the vehicle may communicate the vehicle location for permitting the vehicle to start moving along the route. For example, the onboard control unit 150 shown in FIG. 3 may include the vehicle location in an initialization request message that is communicated to the remote control device. The initialization request message essentially requests the remote control device to grant the vehicle permission to move along the route according to the supervision and tracking provided by the remote control device. Upon receiving permission from the remote control device, the onboard control unit on the vehicle may release the brakes and activate the propulsion system to start propelling the vehicle along the route. Optionally, the vehicle may compare the received vehicle location information to a last known location of the vehicle that is stored in a memory device (e.g., the memory 160) of the vehicle. For example, when the vehicle previously came to a stop, the vehicle may have stored its last known location in the memory. It is possible that the vehicle was moved in the interim between the time that the last known location was determined and the time that the vehicle received the vehicle location from the wayside monitoring assembly. The comparison between the last known location and the determined vehicle location can be used to determine if the vehicle has been moved in the interim.

In an alternative embodiment, the communication device of the wayside monitoring assembly may communicate the vehicle location directly to the remote control device instead of, or in addition to, communicating the vehicle location to the vehicle. The remote control device may use the received vehicle location to update a map of vehicles that are tracked by the remote control device in real-time. Optionally, upon receipt of the vehicle location message, the remote control device may transmit an initialization grant message to the vehicle, granting the vehicle permission to commence movement along the route.

Figure 7:
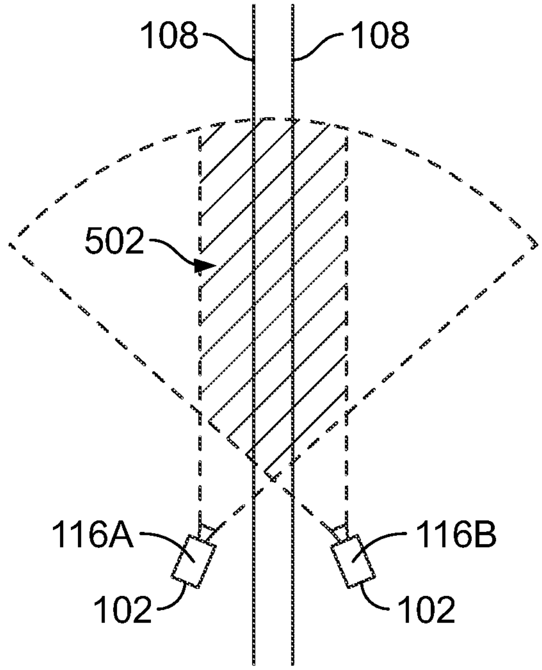
FIG. 7 is an illustration of the vehicle location determining system according to another embodiment in which the observer devices of two different wayside monitoring assemblies monitor overlapping route areas.

FIG. 7 is an illustration of the vehicle location determining system according to an embodiment in which the observer devices 116 of two different wayside monitoring assemblies 102 monitor overlapping route areas. For example, a first observer device 116A and a second observer device 116B may be located on opposite sides of the routes 108. The fields of view of the observer devices overlap to define a combined route area 502 that is monitored by both observer devices. Stated differently, the route area monitored by the first observer device overlaps the route area monitored by the second observer device at the combined route area 502. In an embodiment, the wayside control unit may perform the method described with reference to FIG. 4, except that sensor signals from both observer devices are received and analyzed. By analyzing overlapping image data or other sensor signals generated by different observer devices at different locations, the wayside control unit may be able to increase the accuracy of the vehicle location determination, at the expense of additional computation and analysis. For example, assuming that the method in FIG. 4 is performed on the sensor signals generated by the first observer device, the wayside control unit may also perform the method on the sensor signals generated by the second observer device. More specifically, the wayside control unit may analyze the second sensor signals to determine a second distance of the vehicle from the second observer device. Then, the wayside control unit may combine the data to determine the vehicle location of the vehicle based on (i) the distance of the vehicle from the first observer device, (ii) the predetermined location at which the first observer device is mounted, (iii) the second distance of the vehicle from the second observer device, and (iv) a second predetermined location at which the second observer device is mounted.

As described above, the location of the vehicle may be required before a stationary vehicle is granted permission, from a vehicle control system, to move along a route. The vehicle control system may be a positive vehicle control system. The onboard control unit 150 shown in FIG. 3 of the vehicle may rely on GNSS signals and/or the vehicle location as determined by the vehicle location determining system 100 described herein. For example, if GNSS reception is good, the onboard control unit may use GNSS signals received by an onboard GNSS receiver to determine the vehicle location, and may generate an initialization request message that includes the GNSS-based vehicle location. In areas where GNSS reception is poor, but one or more wayside monitoring assemblies of the vehicle location determining system are present, the onboard control unit may receive a vehicle location that is determined by the vehicle location determining system, and may include that vehicle location in the initialization request message. The remote control device may value both GNSS and the vehicle location determining system as accurate, reliable sources of vehicle location.

In an area where neither GNSS nor the vehicle location determining system is available, as a fallback the onboard control unit may select the last known location of the vehicle as the vehicle location. For example, the onboard control unit may access, in the memory 160, the most recently stored vehicle location information that is reliable and use that location as a baseline. The onboard control unit may attempt to validate the last known location as accurate. For example, the onboard control unit may generate a notification message that is displayed to a human operator that controls the vehicle. The notification message may provide the last known location and inquire the operator as to whether the vehicle is currently located at that last known location. If the onboard control unit receives a user input from the operator indicating that the operator assents, the onboard control unit may identify the last known location as validated, albeit at a reduced level of confidence (e.g., a greater uncertainty) than if the vehicle location is determined by GNSS or the vehicle location determining system. Another way to validate the last known location is to compare the last known location to a location of a nearby GNSS repeater. For example, the last known location may be validated if the last known location is within a designated proximity threshold of the nearby GNSS repeater.

In an embodiment, the onboard control unit may be able to review a log of vehicle activity, such as tachometer data, to determine the movement of the vehicle, if any, after the last known location was recorded. The onboard control unit may use dead reckoning to determine a distance of movement based on the vehicle movement data, wheel diameter, and the like. Based on the dead reckoning and knowledge of the route provided in a route database, the onboard control unit may calculate the current vehicle location by adding the extrapolated movement to the last known location.

After validating last known location and/or calculating the vehicle location based on the last known location, the onboard control unit may generate the initialization request message for communication to the remote control device to request permission to travel along the route. The initialization request message may notify the remote control device that the vehicle location has inherent uncertainty due to the reliance on the last known location. In response, the remote control device may grant the vehicle permission to move along the route in a restricted mode. In the restricted mode, the onboard control unit may be permitted to move along the route without violating certain designated constraints, such as an upper speed limit, a distance of travel, and/or the like. The designated constraints may be more constrictive than regulatory constraints, such as a posted speed limit. As a result, the vehicle may travel slower than the vehicle would be permitted to travel had the vehicle been able to provide a more accurate and reliable vehicle location to the remote control device. Once the vehicle does receive a more accurate and reliable vehicle location, such as via GNSS or the vehicle location determining device, the vehicle can communicate the more accurate and reliable vehicle location in a message to the remote control device, and the remote control device may lift the restricted mode, allowing the vehicle to move in an unrestricted mode.

In an embodiment, a system is provided that includes one or more processors and a communication device. The one or more processors are configured to receive sensor signals output by an observer device that monitors a route area. The one or more processors are configured to analyze the sensor signals to determine a distance of a vehicle within the route area from the observer device, and to determine a vehicle location of the vehicle based on the distance and a predetermined location of the observer device. The communication device is communicatively connected to the one or more processors and configured to communicate the vehicle location to at least one of the vehicle or a remote control device that is off-board the vehicle.

Optionally, the one or more processors and the communication device are disposed within a wayside monitoring assembly that is near the route area. Optionally, the one or more processors may prevent the vehicle from moving along a first route of the route area unless the one or more processors receive a signal from the remote control device, responsive to receiving the vehicle location, that grants permission for the vehicle to move along the first route. The one or more processors may communicate the vehicle location to the at least one of the vehicle or the remote control device prior to the vehicle starting to move along a route occupied by the vehicle. Optionally, the route area encompasses multiple routes, and the one or more processors may identify a specific route of the multiple routes that is occupied by the vehicle based on the sensor signals output by the observer device.

Optionally, the one or more processors may detect the presence of the vehicle within the route area and determine the distance of the vehicle from the observer device by analyzing image data output by a camera of the observer device. The one or more processors may determine the distance of the vehicle from the observer device by comparing a size of a graphical representation of at least a portion of the vehicle depicted in the image data to reference data stored in a memory device. The one or more processors may analyze the image data output by the camera to identify the vehicle relative to one or more other vehicles based on at least one of a graphical indicium displayed on the vehicle or a shape of the vehicle. Optionally, the one or more processors may determine the distance of the vehicle from the observer device by analyzing the sensor signals output by at least one of an ultrasonic distance sensor or an optical distance sensor of the observer device.

Optionally, the observer device is a first observer device, and the one or more processors may receive second sensor signals from a second observer device that is spaced apart from the first observer device. The second observer device may monitor at least a portion of the route area monitored by the first observer device. The one or more processors may analyze second sensor signals generated by the second observer device to determine a second distance of the vehicle from the second observer device. The one or more processors may determine the vehicle location of the vehicle based on (i) the distance of the vehicle from the first observer device, (ii) the predetermined location at which the first observer device is mounted, (iii) the second distance of the vehicle from the second observer device, and (iv) a second predetermined location at which the second observer device is mounted.

Optionally, the route occupied by the vehicle comprises a track, and the vehicle is a rail vehicle. Optionally, responsive to determining that the vehicle is not present within the route area and signals from a GNSS receiver are not available, the one or more processors may restrict at least one of a speed or a distance that the vehicle can move along the route until at least one of the vehicle is present within the route area or the signals from the GNSS receiver are available. The one or more processors may determine the vehicle location in positional coordinates.

In an embodiment, a method is provided that includes receiving sensor signals output by an observer device that monitors a route area, and detecting a presence of a vehicle within the route area. The method includes analyzing the sensor signals to determine a distance of the vehicle from the observer device, and determining a vehicle location of the vehicle based on the distance and a predetermined location at which the observer device is mounted. The method includes generating a message, comprising the vehicle location, to be communicated to at least one of the vehicle or a remote control device that is off-board the vehicle.

Optionally, the message may be generated while the vehicle is stationary on a route within the route area. The method may include preventing the vehicle from moving along the route until the vehicle receives permission from the remote control device, responsive to receiving the vehicle location, to move along the route. Optionally, the route area encompasses multiple routes, and determining the vehicle location may include identifying a specific route of the multiple routes that is occupied by the vehicle based on the sensor signals generated by the observer device. Optionally, receiving the sensor signals output by the observer device comprises receiving image data generated by a camera of the observer device. The method may include identifying the vehicle relative to one or more other vehicles based on one or both of a graphical indicium displayed on the vehicle in the image data or a shape of the vehicle in the image data.

In an embodiment, a wayside monitoring assembly is provided that includes a camera, one or more processors, and a communication device. The camera is configured to be mounted proximate one or more routes and oriented to monitor a route area including at least one route of the one or more routes. The one or more processors are configured to analyze image data generated by the camera to detect a presence of a vehicle within the route area and determine a distance of the vehicle from the camera. The one or more processors are configured to determine a vehicle location of the vehicle based on the distance and a predetermined location at which the camera is mounted. The communication device is configured to communicate the vehicle location to at least one of the vehicle or a remote control device off-board the vehicle.

In one embodiment, the control system may have a local data collection system deployed that may use machine learning to enable derivation-based learning outcomes. The control system may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the control system may use evolution strategies techniques to tune various parameters of the artificial neural network. The control system may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The control system or device can use this artificial intelligence or machine learning to receive input (e.g., a location or change in location), use a model that associates locations with different operating modes to select an operating mode of the one or more functional devices of the HOV unit and/or EOV unit, and then provide an output (e.g., the operating mode selected using the model). The control system may receive additional input of the change in operating mode that was selected, such as analysis of noise or interference in communication signals (or a lack thereof), operator input, or the like, that indicates whether the machine-selected operating mode provided a desirable outcome or not. Based on this additional input, the control system can change the model, such as by changing which operating mode would be selected when a similar or identical location or change in location is received the next time or iteration. The control system can then use the changed or updated model again to select an operating mode, receive feedback on the selected operating mode, change or update the model again, etc., in additional iterations to repeatedly improve or change the model using artificial intelligence or machine learning.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term may include tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

As used herein, the "one or more processors" may individually or collectively, as a group, perform these operations. For example, the "one or more" processors can indicate that each processor performs each of these operations, or that each processor performs at least one, but not all, of these operations. If a system, apparatus, assembly, device, etc. (e.g., a controller, control device, control unit, etc.) includes multiple processors, these processors may be located in the same housing or enclosure (e.g., in the same device) or may be distributed among or between two or more housings or enclosures (e.g., in different devices). The multiple processors in the same or different devices may each perform the same functions described herein, or the multiple processors in the same or different devices may share performance of the functions described herein. For example, different processors may perform different sets or groups of the functions described herein.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

This written description uses examples to disclose several embodiments of the subject matter, including the best mode, and to enable a person of ordinary skill in the art to practice the embodiments, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

an observer device configured to monitor a route area, the observer device located off- board a vehicle;

one or more processors configured to receive sensor signals output by the observer device, the one or more processors configured to analyze the sensor signals to determine a distance of the vehicle within the route area from the observer device, and the one or more processors configured to determine a vehicle location of the vehicle based on the distance and a predetermined location of the observer device;

a remote control device configured to control the vehicle by permitting movement based on the vehicle location and one or more movement restrictions for the route area, the remote control device located off-board the vehicle; and a communication device communicatively connected to the one or more processors and configured to communicate the vehicle location to at least one of the vehicle or the remote control device, wherein the one or more processors are configured to detect a presence of the vehicle within the route area and determine the distance of the vehicle from the observer device by analyzing image data output by a camera of the observer device.

2. The system of claim 1, wherein the one or more processors and the communication device are disposed within a wayside monitoring assembly that is near the route area.

3. The system of claim 1, wherein the one or more processors are configured to prevent the vehicle from moving along a first route of the route area unless the one or more processors receive a signal from the remote control device, responsive to receiving the vehicle location, that grants permission for the vehicle to move along the first route.

4. The system of claim 1, wherein the one or more processors are configured to communicate the vehicle location to the at least one of the vehicle or the remote control device prior to the vehicle starting to move along a route occupied by the vehicle.

5. The system of claim 1, wherein the route area encompasses multiple routes, and the one or more processors are configured to identify a specific route of the multiple routes that is occupied by the vehicle based on the sensor signals output by the observer device.

6. The system of claim 1, wherein the one or more processors are configured to determine the distance of the vehicle from the observer device by comparing a size of a graphical representation of at least a portion of the vehicle depicted in the image data to reference data stored in a memory device.

7. The system of claim 1, wherein the one or more processors are configured to analyze the image data output by the camera to identify the vehicle relative to one or more other vehicles based on at least one of a graphical indicium displayed on the vehicle or a shape of the vehicle.

8. The system of claim 1, wherein the one or more processors are configured to determine the distance of the vehicle from the observer device by analyzing the sensor signals output by at least one of an ultrasonic distance sensor or an optical distance sensor of the observer device.

9. The system of claim 1, wherein the observer device is a first observer device, and the one or more processors are configured to receive second sensor signals from a second observer device that is spaced apart from the first observer device, the second observer device configured to monitor at least a portion of the route area monitored by the first observer device, wherein the one or more processors are configured to analyze second sensor signals generated by the second observer device to determine a second distance of the vehicle from the second observer device, the one or more processors configured to determine the vehicle location of the vehicle based on (i) the distance of the vehicle from the first observer device, (ii) the predetermined location at which the first observer device is mounted, (iii) the second distance of the vehicle from the second observer device, and (iv) a second predetermined location at which the second observer device is mounted.

10. The system of claim 1, wherein the route occupied by the vehicle comprises a track, and the vehicle is a rail vehicle.

11. The system of claim 1, wherein, responsive to determining that the vehicle is not present within the route area and signals from a GNSS receiver are not available, the one or more processors are configured to restrict at least one of a speed or a distance that the vehicle can move along the route until at least one of the vehicle is present within the route area or the signals from the GNSS receiver are available.

12. The system of claim 1, wherein the one or more processors are configured to determine the vehicle location in positional coordinates.

13. A method comprising:

receiving sensor signals output by an observer device that monitors a route area, the observer device located off-board a vehicle;

detecting a presence of the vehicle within the route area;

analyzing the sensor signals to determine a distance of the vehicle from the observer device;

determining a vehicle location of the vehicle based on the distance and a predetermined location at which the observer device is mounted;

generating a message, comprising the vehicle location, to be communicated to at least one of the vehicle or a remote control device that is off-board the vehicle; and controlling the vehicle by permitting movement based on the vehicle location and one or more movement restrictions for the route area, wherein receiving the sensor signals output by the observer device comprises receiving image data generated by a camera of the observer device, and wherein analyzing the sensor signals to determine the distance of the vehicle from the observer device comprises analyzing the image data generated by the camera of the observer device to determine the distance of the vehicle from the observer device.

14. The method of claim 13, wherein the message is generated while the vehicle is stationary on a route within the route area.

15. The method of claim 14, further comprising preventing the vehicle from moving along the route until the vehicle receives permission from the remote control device, responsive to receiving the vehicle location, to move along the route.

16. The method of claim 13, wherein the route area encompasses multiple routes, and determining the vehicle location includes identifying a specific route of the multiple routes that is occupied by the vehicle based on the sensor signals generated by the observer device.

17. The method of claim 13, further comprising identifying the vehicle relative to one or more other vehicles based on one or both of a graphical indicium displayed on the vehicle in the image data or a shape of the vehicle in the image data.

18. A wayside monitoring assembly comprising:

a camera configured to be mounted proximate one or more routes and oriented to monitor a route area including at least one route of the one or more routes;

one or more processors configured to analyze image data generated by the camera to detect a presence of a vehicle within the route area and determine a distance of the vehicle from the camera, the one or more processors configured to determine a vehicle location of the vehicle based on the distance and a predetermined location at which the camera is mounted;

a remote control device configured to control the vehicle by permitting movement based on the vehicle location and one or more movement restrictions for the route area, the remote control device located off-board the vehicle; and a communication device configured to communicate the vehicle location to at least one of the vehicle or the remote control device.

* * * * *